United States Patent [19]
Kanai et al.

[11] Patent Number: 4,992,893
[45] Date of Patent: Feb. 12, 1991

[54] ALIGNMENT DISK FOR MAGNETIC DISK DRIVING APPARATUS AND METHOD AND APPARATUS FOR VERIFYING TRACKING ERROR OF THE MAGNETIC DISK DRIVING APPARATUS

[75] Inventors: Hiroshi Kanai; Takeo Sonobe, both of Hitachi; Seiichi Hayashi, Mito; Masayoshi Sunada; Kazuo Kikuchi, both of Hitachi; Yasumasa Saito, Katsuta; Toshiaki Suematsu, Hitachi; Tetsuro Hatakeyama, Hitachi; Yousuke Nagano, Hitachi; Shinji Mizunuma, Hitachi; Hitoshi Ishida; Junichi Enomoto, Hitachi; Kazuei Saito, Hitachi, all of Japan

[73] Assignee: Hitachi, Ltd., Tokyo, Japan

[21] Appl. No.: 14,786

[22] Filed: Feb. 13, 1987

[30] Foreign Application Priority Data

Feb. 19, 1986 [JP] Japan .................................. 61-33070
Apr. 4, 1986 [JP] Japan .................................. 61-76566
Jun. 6, 1986 [JP] Japan .................................. 61-130128

[51] Int. Cl.$^5$ .................. G11B 5/55; G11B 5/596; G11B 23/36
[52] U.S. Cl. .................. 360/78.13; 360/75; 360/77.04; 360/135; 360/76
[58] Field of Search .................. 360/31, 75, 76–78, 360/135, 109, 78.04, 78.13

[56] References Cited

U.S. PATENT DOCUMENTS

| | | | |
|---|---|---|---|
| 4,084,201 | 4/1978 | Hack et al. | 360/135 |
| 4,325,134 | 4/1982 | Langley et al. | |
| 4,371,904 | 2/1983 | Brooke | 360/77.02 |
| 4,458,274 | 7/1984 | Charlson et al. | 360/75 |
| 4,513,331 | 4/1985 | Baker et al. | 360/75 |
| 4,542,428 | 9/1985 | Yanagi | 360/75 |
| 4,623,942 | 11/1986 | Kraus et al. | 360/75 |
| 4,694,359 | 9/1987 | Oya | 360/76 |
| 4,775,902 | 10/1988 | Trouato et al. | 360/78.13 |

FOREIGN PATENT DOCUMENTS

| | | |
|---|---|---|
| 0035915 | 9/1981 | European Pat. Off. |
| 0121590 | 10/1984 | European Pat. Off. |
| 0162407 | 11/1985 | European Pat. Off. |
| 0179299 | 4/1986 | European Pat. Off. |
| 59-7142 | 2/1984 | Japan |
| 61-45409 | 3/1986 | Japan .................................. 360/135 |
| 1374571 | 11/1974 | United Kingdom |
| 2054240 | 2/1981 | United Kingdom |
| 2143073 | 1/1985 | United Kingdom |

OTHER PUBLICATIONS

IBM TDB, vol. 17, No. 11 "Eccentricity Tolerant Head Alignment Check", Sibbers, 4/75, pp. 3415–3416.

*Primary Examiner*—Aristotelis M. Psitos
*Assistant Examiner*—Steven R. Garland
*Attorney, Agent, or Firm*—Antonelli, Terry, Stout & Kraus

[57] ABSTRACT

An alignment disk having an adjust signal recorded thereon to maintain data interchangeability of a magnetic disk drive apparatus and loadable and unloadable to and from the magnetic disk drive apparatus, and method and apparatus for verifying a tracking errors of the magnetic disk drive apparatus are disclosed; the magnetic disk drive apparatus including magnetic head means for recording and reproducing data on and from a magnetic recording medium, a head carriage for carrying the magnetic head means, and drive means for driving the head carriage radially of a track of the magnetic recording medium; the alignment disk having a set of track diameter adjust signal pairs recorded on tracks equal to or larger in number than the number of phases of a stepping motor for driving the head carriage and corresponding to at least the excitation phases of the stepping motor; the set of track diameter adjust signal pairs each having an inner track signal and an outer track signal extending inward and outward from a center of the track; and the set of track diameter adjust signal pairs being arranged symmetrically about a rotation axis of the disk.

30 Claims, 11 Drawing Sheets

FIG. 6

| TRACK NO. | STEPPING MOTOR | | ADJUST SIGNAL TRACK CENTER |
|---|---|---|---|
| | PHASE | MARK | |
| 00 | 0 | ○ | |
| 01 | 1 | X | T1 |
| 02 | 2 | △ | |
| 03 | 3 | □ | |
| 04 | 0 | ○ | |
| 05 | 1 | X | |
| 06 | 2 | △ | |
| 07 | 3 | □ | |
| 08 | 0 | ○ | |
| 09 | 1 | X | |
| 10 | 2 | △ | |
| 11 | 3 | □ | |
| 12 | 0 | ○ | |
| 13 | 1 | X | |
| 14 | 2 | △ | |
| 15 | 3 | □ | |
| 16 | 0 | ○ | T16 |
| 17 | 1 | X | |
| 18 | 2 | △ | |
| 19 | 3 | □ | T19 |
| 20 | 0 | ○ | |
| 21 | 1 | X | |
| 22 | 2 | △ | T22 |
| 23 | 3 | □ | |
| 24 | 0 | ○ | |
| 25 | 1 | X | T25 |
| 26 | 2 | △ | |
| 27 | 3 | □ | |
| 28 | 0 | ○ | |
| 29 | 1 | X | |
| 30 | 2 | △ | |
| 31 | 3 | □ | |
| 32 | 0 | ○ | |
| 33 | 1 | X | |
| 34 | 2 | △ | |
| 35 | 3 | □ | |
| 36 | 0 | ○ | |
| 37 | 1 | X | T37 |
| 38 | 2 | △ | |
| 39 | 3 | □ | |

F I G. 8
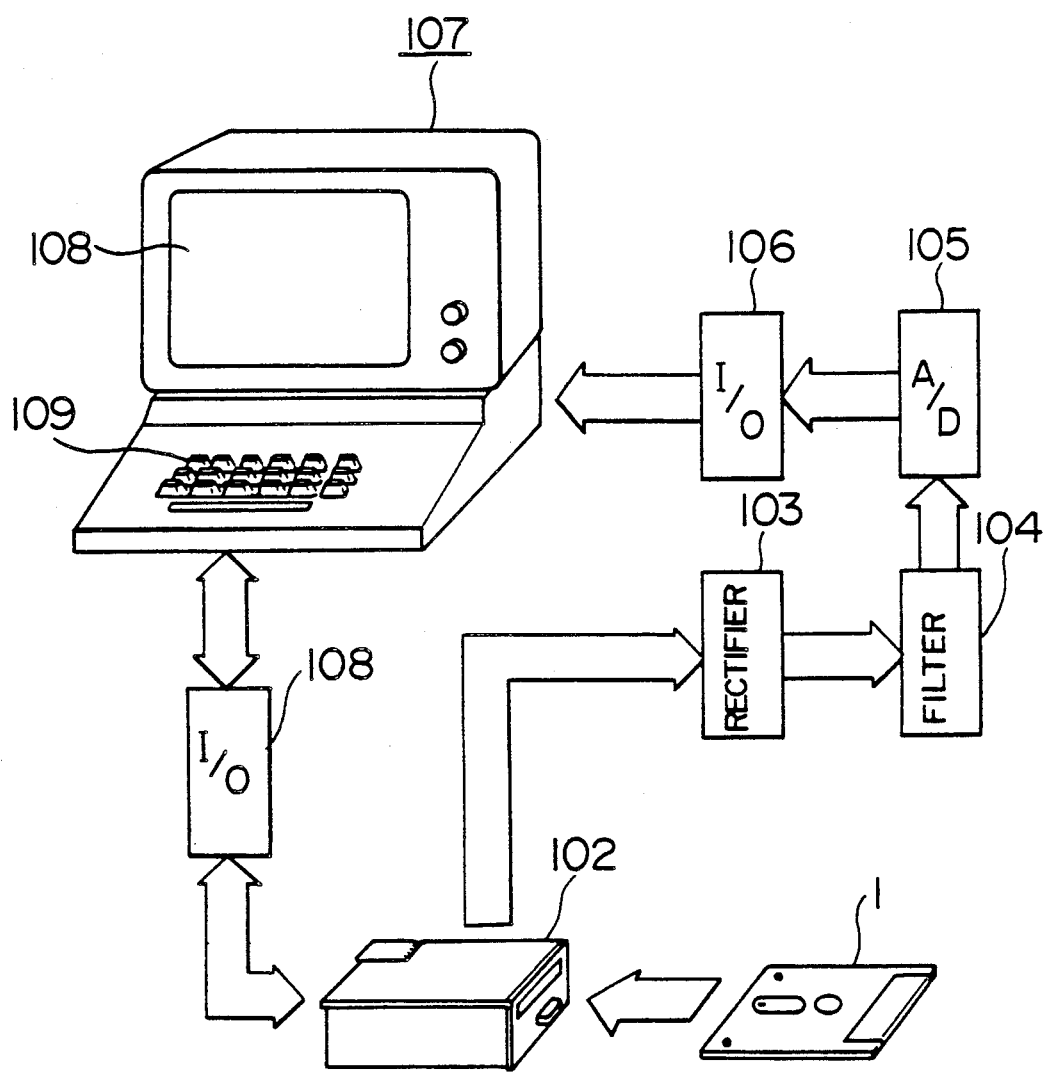

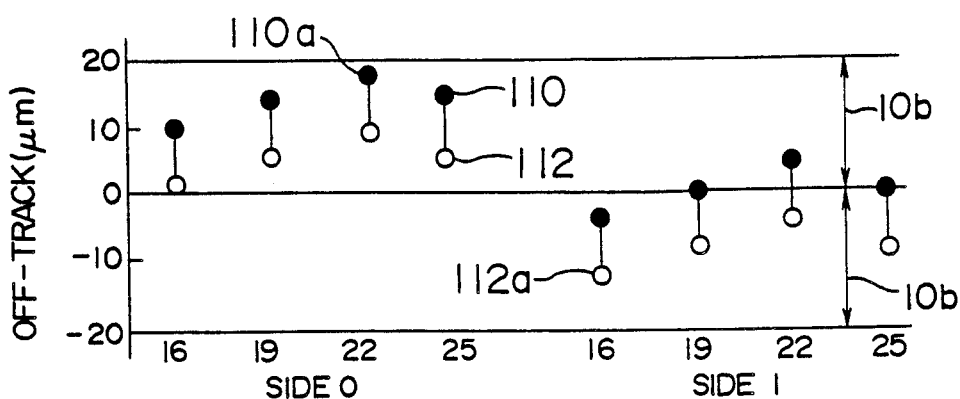
F I G. 12
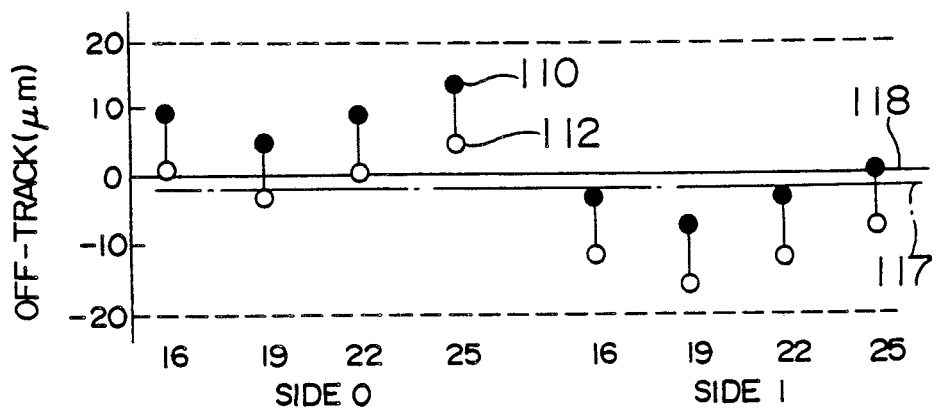
F I G. 13
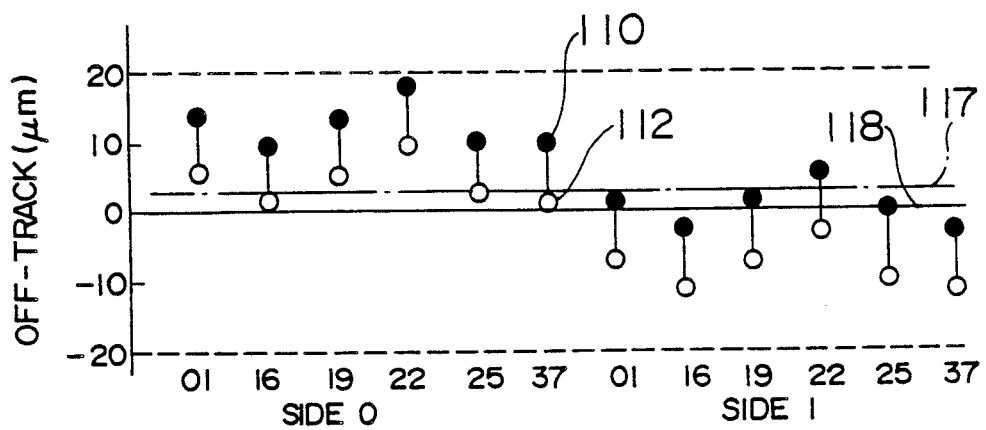
F I G. 14

ALIGNMENT DISK FOR MAGNETIC DISK DRIVING APPARATUS AND METHOD AND APPARATUS FOR VERIFYING TRACKING ERROR OF THE MAGNETIC DISK DRIVING APPARATUS

BACKGROUND OF THE INVENTION

The present invention relates to an alignment disk for a magnetic disk driving apparatus which enables high precision tracking when a head carriage drive of the magnetic disk driving apparatus is positioned to a predetermined position along a track diameter, and particularly when a drive of a magnetic disk having a bit density of more than 96 or 100 tracks per inch (TPI) is positioned, and to method and apparatus for verifying a tracking error of the magnetic disk driving apparatus.

A prior art alignment disk is explained. JP-B-59-7142 discloses an example of the prior art alignment disk. An index mark and a track diametric positioning signal are recorded on the disk. The positioning signal of the alignment disk is supplied to a magnetic disk driving apparatus, reproduced by a magnetic head and displayed on an osciloscope. In this manner, the track diametric positioning is attained.

However, the above prior art alignment disk does not have all of a track diameter adjust signal, index timing adjust signal and azimuth adjust signal, which are necessary for data interchangeability. The adjustment by the osciloscope is of low resolution and assures the data interchangeability between magnetic disk driving apparatuses of a class of 48 PTI, but it is hard to assure the data compatibility between the magnetic disk driving apparatuses of a higher bit density, i.e. 96 TPI or 100 TPI.

Another example of the prior art alignment disk is explained with reference to FIG. 1. An index timing adjust signal 21 is provided on an outer track of an alignment disk 1. A track diameter adjust signal 36 is provided on a center track between an inner track and the outer track. The signal 36 comprises a larger diameter signal 37 which is eccentric from a center of rotation 2 by a predetermined distance $\epsilon = 0.1$ mm and larger than a reference diameter by $\delta/2 = 0.075$ mm, and a smaller diameter signal 38 which is also eccentric from the center of rotation 2 by the distance s and smaller than the reference diameter by $\delta/2$. These signals 37 and 38 are detected by a so-called cat eye signal. A CW (clockwise) signal 31 and a CCW (counter clockwise) signal 32 are provided on the inner track as an azimuth adjust signal 30. The same signals are recorded on a back side of the alignment disk 1 so that two upper and lower heads are tracked.

In the tracking adjustment by using the alignment disk, the alignment disk 1 is loaded to the magnetic disk driving apparatus, a head carriage is moved to a particular track of the disk, and the adjust signals are reproduced and displayed on the osciloscope.

In the index timing adjust, a time period T from an index timing detection point IDX to the index timing adjust signal 21 is measured, and the position of the index detection sensor is adjusted such that the time period T is within a predetermined period.

In the track diameter adjustment, the stepping motor is finely adjusted such that output voltages of the larger diameter signal 37 and the smaller diameter signal 38 become the same. In the azimuth adjustment, the head inclination is adjusted such that a ratio of the four signals 31 and 32 is within a predetermined range.

By using the above alignment disk, the index timing adjustment and the azimuth detection of the magnetic disk driving apparatus are attained. However, the resolution attained by the track diameter adjustment by the cat eye signal is low and it is hard to assure the data interchangeability of the driving apparatus the high density magnetic disk such as 96 TPI or 100 TPI.

Further, it is not possible to determine a chucking error based on a format of the reproduced signal.

The data interchangeability of the high density magnetic disk driving apparatus is now explained. Because there are a plurality of magnetic disk driving apparatuses on which magnetic disks are loaded and unloaded record and reproduce data, there is an error (called an off-track) between a predetermined track diametric position on the disk and an actual position at which the magnetic head is positioned by the magnetic disk driving apparatus. Major causes therefor are:

(1) Position adjust error of the carriage.
(2) Positioning error of the carriage.
(3) Chucking error (eccentricity) caused when the magnetic disk is chucked to the magnetic disk driving apparatus.
(4) Difference in expansion and shrinkage of the magnetic disk and the magnetic disk driving apparatus by temperature and humidity change.

As to the index timing and the azimuth, there are also errors between two magnetic disk driving apparatuses.

In the 96 TPI magnetic disk driving apparatus a tolerance X of the off-track relates to a magnetic head R/W gap width $W = 165$ μm and an erase core width $E_r = 100$ μm, and X is approximately 50 μm. The tolerance $X = 50$ μm is distributed into the error items (1) to (4) so that the total of the errors of the items (1) to (4) is within 50 μm, in order to assure the data interchangeability. However, the expansion/shrinkage error by the temperature and humidity in the item (4) is hard to reduce because of a large affect by a property of matter of the material.

The error items (1) to (3) are analyzed.

(1) The carriage position adjust error is an error caused when the head and a carriage transmission system are assembled into the carriage. This error closely relates to the assemble and adjust time. In order to reduce the error, the adjust time must be significantly lengthened.

(2) The carriage positioning error is caused by a stepping motor (STM) positioning error due to precision errors of parts of the STM and its drive system, and a positioning error due to precision errors of parts of the STM drive force transmission system. However, in the drive of the high density magnetic disk, the manufacturing precisions of the STM, drive system and transmission system have reached the limits, and if the precision is to be more improved, the yield is reduced, which will lead to the cost increase and quality instability.

(3) Major causes of the chucking error are a precision of parts of the chuck unit of the magnetic disk, and a precision of parts of the chucking unit of the magnetic disk driving apparatus. The precision of the parts in the high density magnetic disk driving apparatus reached its limit, and if the precision is to be improved, the yield is reduced which leads to the increase of cost and the instability of quality.

As described above, in the high density magnetic disk driving apparatus, the precision for the components is at their limits, and in order to assure the data interchangeability between the magnetic disk driving apparatuses on which a plurality of disks are loaded and unloaded, it is necessary to improve the precision of components which leads to the cost increase, or to improve the precision of the position adjustment of the head carriage driver. Those cause problems in the manufacturing efficiency and reliability.

In the prior art apparatus, the positioning error of the stepping motor, hysteresis error and accumulated error of the transmission system, which are to be detected in the tracking adjustment to assure the data interchangeability, are not detected as a result, the off-track increase in the tracks other than the adjusted track or in the innermost and outermost tracks and the read/write error occurs. Further, the prior art apparatus cannot measure the chucking error between the magnetic disk driving apparatus and the magnetic recording medium, and the off-track increases by the eccentricity due to the chucking error and the tracking error occurs.

SUMMARY OF THE INVENTION

It is a first object of the present invention to provide an alignment disk which enables detection of a precision of a component of a magnetic disk driving apparatus.

It is a second object of the present invention to provide a tracking detection apparatus for detecting a precision of components of a magnetic disk driving apparatus by using an alignment disk during assembly of the magnetic disk driving apparatus, improves a precision of carriage position adjustment and reduces an adjustment time, and improves productivity and reliability.

It is a third object of the present invention to provide a tracking detection method which can improve a precision of positioning of a magnetic head due to a positioning error of a stepping motor of the magnetic disk driving apparatus, a hysteresis error and an accumulated error of a stepping motor drive force transmission system.

In order to achieve the above objects, the alignment disk of the present invention having a set of track diameter adjust signal pairs recorded on each of tracks which are equal to or larger than the number of phases of the stepping motor which drives the head carriage and each of which corresponds to each phase of the stepping motor. Each of the set of track diameter adjust signal pairs comprises an inner signal and an outer signal extending inward and outward from the center of the corresponding track, and the plurality of pairs are arranged symmetrically about the rotation axis of the disk.

The alignment disk has preferably a set of track diameter adjust signal pairs recorded on at least one of the tracks close to the innermost and the outermost.

The alignment disk preferably has the index timing adjust signal for detecting the position of the magnetic head in the direction of the disk rotation recorded on one track at such a position that it is detected upon the lapse of a predetermined time after the detection of the index timing detection point, and an azimuth adjust signal, for detecting an inclination of a read/write gap of the magnetic head recorded on the center of the track, including a CW signal recorded by a magnetic head having a predetermined angle clockwise with respect to a radial line extending from the rotation axis and a CCW signal recorded by a magnetic head having the predetermined angle counterclockwise.

BRIEF DESCRIPTION OF THE DRAWINGS

FIG. 6 shows arrangement of adjust signals in the alignment disk of the present invention, FIG. 8 shows a block diagram of one embodiment of a tracking verification apparatus for the magnetic disk driving apparatus in accordance with the present invention, FIGS. 9(a)-(d) and 10(1-(b) show waveforms of adjust signals reproduced from the alignment disk, FIG. 11 shows an example of display on a CRT of the adjust signal reproduced from the alignment disk, FIGS. 12 to 14 show other examples of display on the CRT of the adjust signal reproduced from the alignment disk, and FIG. 15 shows a flow chart of a tracking adjust method of the present invention.

DESCRIPTION OF THE PREFERRED EMBODIMENTS

One embodiment of the alignment disk for the magnetic disk driving apparatus is explained with reference to FIG. 2.

Figure 1:
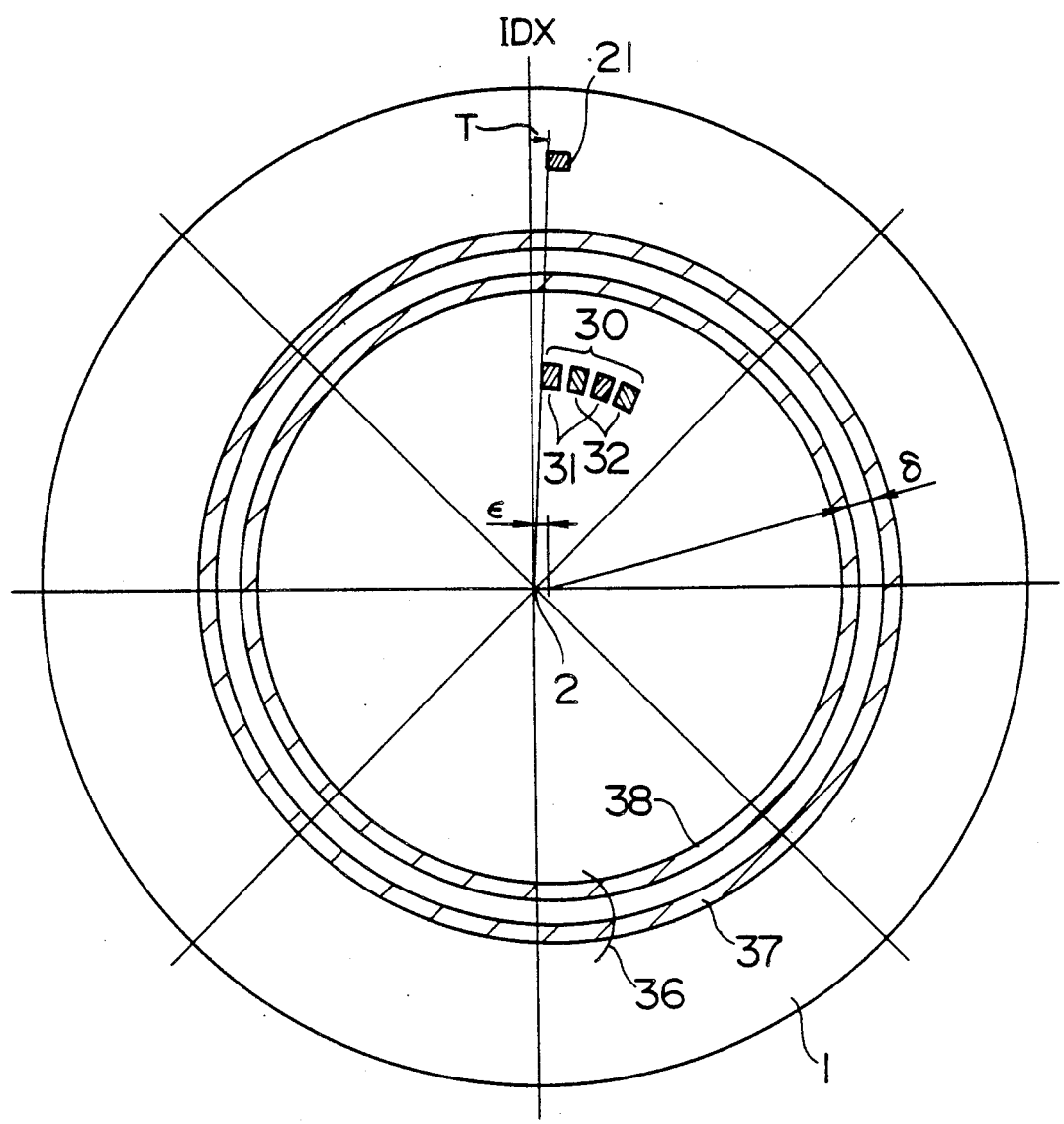
FIG. 1 shows a front view of a prior art alignment disk.
Figure 2:
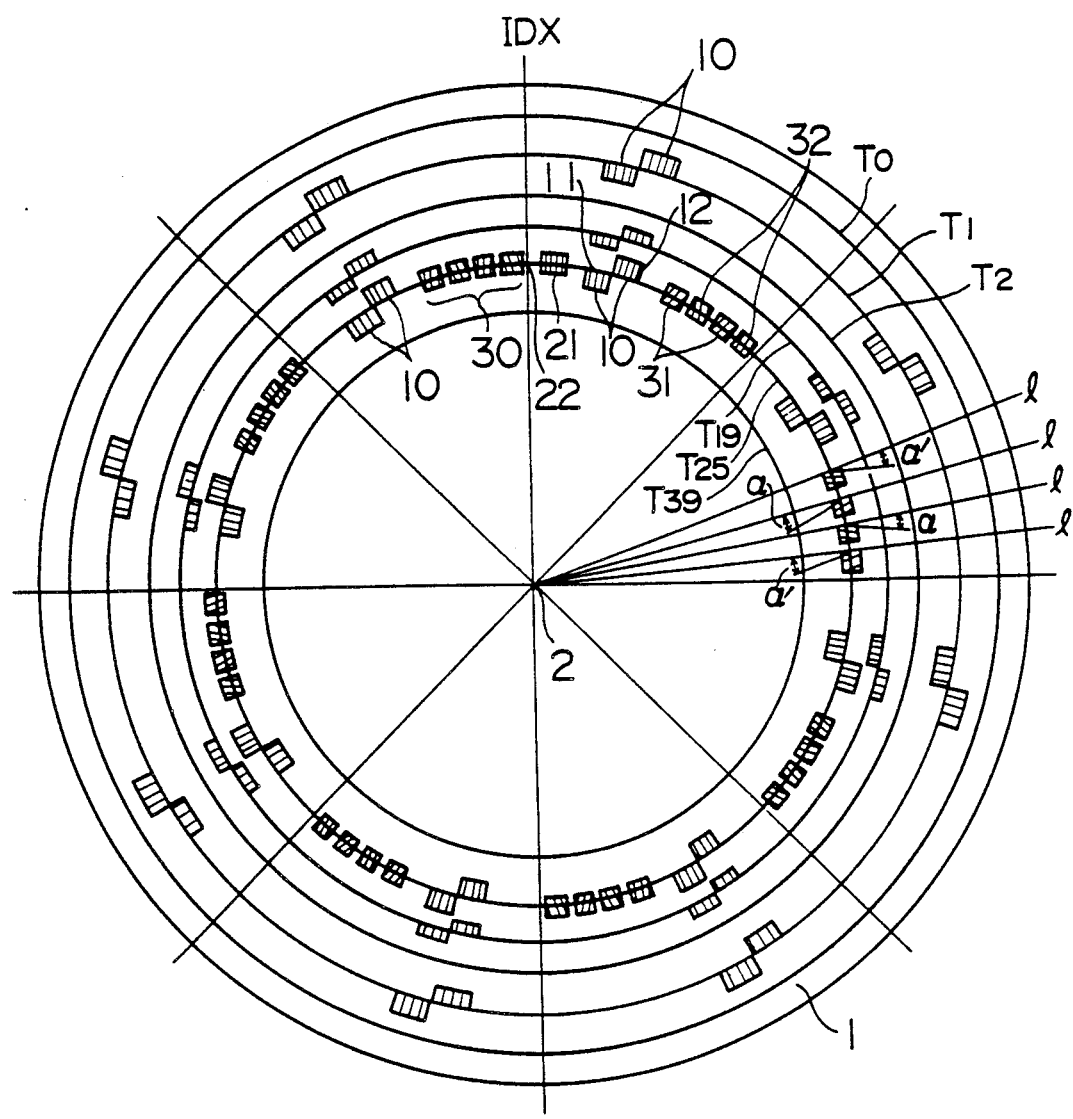
FIG. 2 shows a front view of an embodiment of an alignment disk of the present invention.

The alignment disk shown in FIG. 2 has, for example, 40 tracks, only six of which are shown in FIG. 2 for a sake of simplification. On the center of the 26th track $T_{25}$ of the adjust signal tracks of the alignment disk 1, a track diameter adjust signal including a pair of inner signal 11 and outer signal 12 extending alternately inward and outward from the center of the track are recorded. The 4-96 pairs (8 pairs in the present embodiment) of diameter adjust signal 10 are arranged on the center of the track T25 symmetrically with respect to the rotation axis 2 of the disk 1. A timing signal 21 is arranged, as an index timing adjust signal 20, on the center of the adjust signal track $T_{25}$ at a position corresponding to a predetermined time T after an index timing detection point (IDX) 22. An azimuth adjust signal 30 including preferably a pair of CW signal 31 recorded by a signal write head 65 inclined by predetermined angles $\alpha$ and $\alpha'$ clockwise with respect to a radial line 1 extending from the rotation axis 2 and a pair of CCW signals 32 recorded by a signal write head 65 inclined by the angle $\alpha$ and $\alpha'$ counterclockwise with respect to the line 1, are arranged on the center of the adjust signal track $T_{25}$. The azimuth adjust signal may include only one CW signal and one CCW signal each inclined by the same angle $\alpha$ or $\alpha'$. The 4 to 96 (8 in the present embodiment) azimuth adjust signals 30 are arranged alternately to the track diameter adjust signal pairs. The index timing signal and the azimuth adjust signal may be separately arranged on other tracks than the track diameter adjust signal track.

The diameter adjust signals are also recorded on the tracks which are equal to or larger than the number of phases of a stepping motor for driving the head carriage, and each of which corresponds to at least one phase of the stepping motor assuming that the stepping motor in the present embodiment has four phases, for example, eight pairs of track diameter adjust signal are recorded on each of three tracks in addition to the track $T_{25}$, for example, the 17th, 20th and 23rd tracks $T_{16}$, $T_{19}$ and $T_{22}$.

Further, eight pairs of track diameter adjust signal are recorded on at least one of the tracks close to the outermost track and the innermost track. In the present embodiment, they are recorded on the second track $T_1$ and the 38th track $T_{37}$ where the stepping motor phases are identical.

In FIG. 2, only the first, second, third, 20th, 26th and 40th tracks $T_0$, $T_1$, $T_2$, $T_{19}$, $T_{25}$ and $T_{39}$ are shown although the track diameter adjust signals are also recorded on the tracks $T_{16}$, $T_{22}$ and $T_{37}$.

FIG. 2 shows a front surface of the alignment disk 1. The same signals are recorded on a rear surface.

Figure 3:
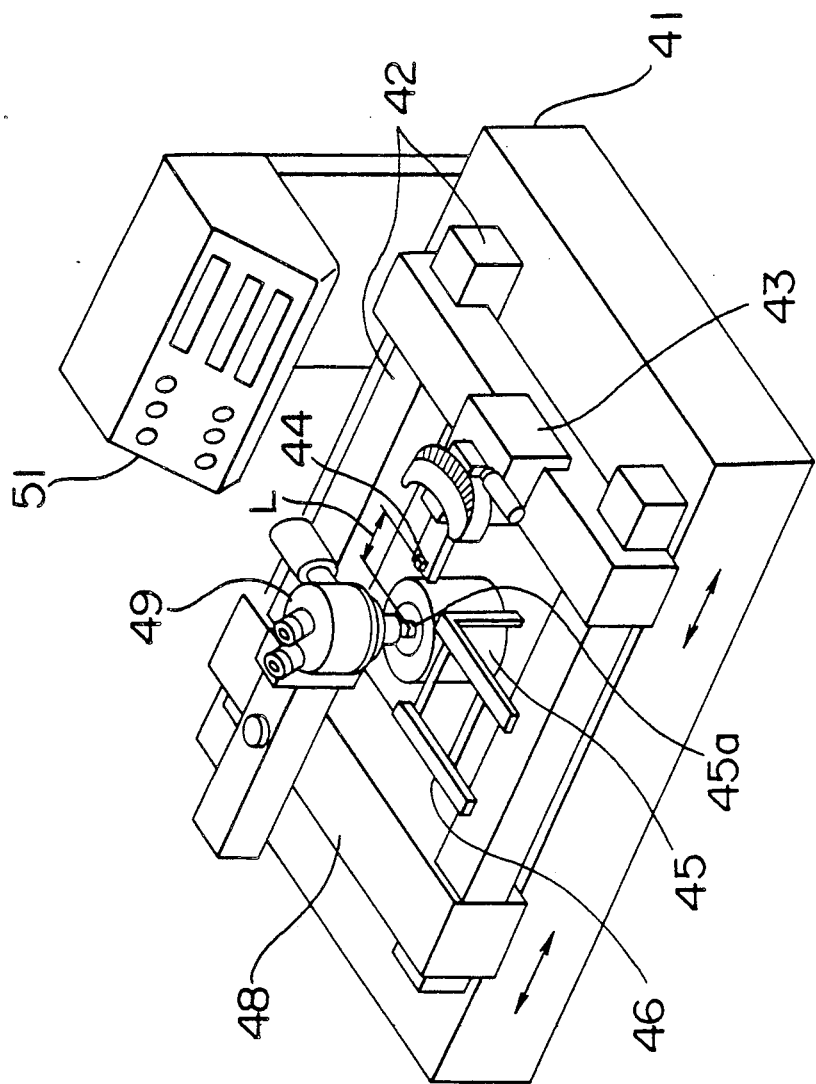
FIG. 3 shows a signal write apparatus for the alignment disk.

The signals are recorded on the alignment disk 1 by a signal write apparatus 40 shown in FIG. 3. As shown in FIG. 3, the signal write apparatus 40 comprises a table 41, a carriage 43 carrying magnetic heads 44, a guide 42 for moving the carriage 43 radially of the alignment disk 1, a direct drive (DD) motor 45 for rotating the disk 1 and a microscope 49 for detecting position of a center of a spindle 45a of the DD motor 45 and a center of a R/W gap of the magnetic heads 44.

The signals are written into the alignment disk 1 in the following manner. The disk 1 is mounted on the DD motor 5 through a disk mount mechanism 46, and the microscope 49 is moved radially of the disk and the center of rotation 45a of the DD motor 45 is detected by watching the microscope. Then, the magnetic head 44 is moved to the center Ta of the track which is spaced from the center of rotation 45a by a distance L and on which the track diameter adjust signal is to be written. The head 44 is positioned while the read/write gap center 44a of the head 44 is watched through the microscope 49 such that the read/write gap center 44a is positioned to the track center Ta.

Then, the track diameter adjust signal, index timing signal and the azimuth adjust signal are written on the track center Ta of the disk 1 by applying these signals to the heads 44 from a signal generator (not shown) in an operation panel 51.

Figure 4:
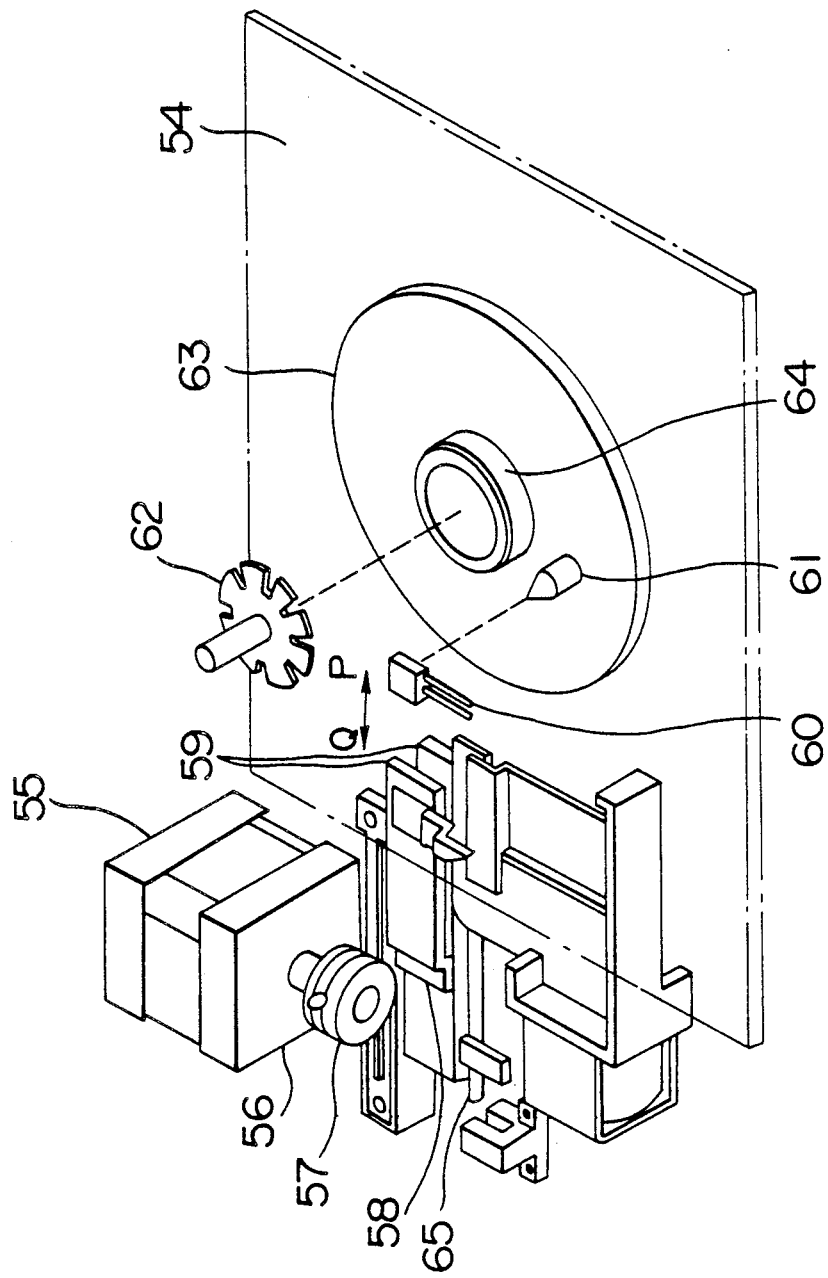
FIG. 4 shows a perspective view of a magnetic disk driving apparatus.

Construction and operation of the magnetic disk driving apparatus adjusted and verified by the alignment disk 1 are explained with reference to FIG. 4. The magnetic disk 54 is chucked to a rotary bearing 64 of a direct drive (DD) motor 63 by a collet 62 and rotated by the DD motor at a constant speed. The carriage 58 which carries the magnetic head 59 is movable radially of the track by the STM 55, and the head 59 is positioned to a target track by the carriage 58 to record and reproduce data on and from the magnetic disk 54. The head positioning mechanism is explained. The STM 55 fixed to a chassis (not shown) changes its rotation angle stepwise by a control signal supplied from an I/O circuit 108. Thus, the carriage 58 is linearly moved along a rail 65 through a steel belt wrapped around a pully 57. Accordingly, the magnetic head 59 mounted on the carriage 58 is linearly moved stepwise at a constant pitch radially of the magnetic disk 54. By setting the pitch to a track pitch, the magnetic head 59 is positioned to the track. The index direction which is the direction of the rotation of the magnetic disk 54 is detected by an index timing photo-emitter 60 and an index timing photo-sensor 61.

Factors of the positioning error by such a magnetic head positioning mechanism are:
(1) a positioning error of the STM 55 and a hysteresis error which depends on a load,
(2) an accumulated error of the STM drive force transmission system which depends on circularity of the pulley 57, thickness of the steel belt 56 and manner of wrapping,
(3) chucking error representing eccentricity between the center of a disk and the center of the rotation axis of the motor, caused when the magnetic disk 54 is chucked, and
(4) an error from a standard distance in the radial direction of the disk between upper and lower magnetic heads.

Figure 5:
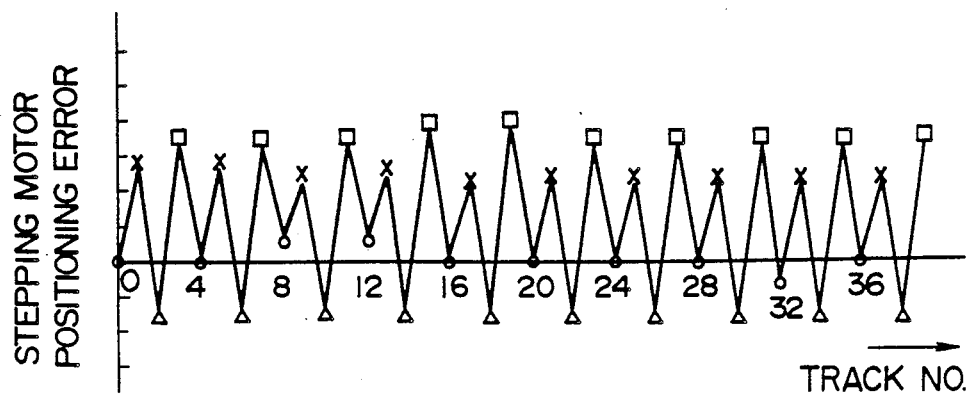
FIG. 5 is a characteristic chart illustrating a positioning error of a stepping motor.

The positioning error of the stepping motor 55 is explained with reference to FIG. 5. Assuming that the number of tracks is 40, the outermost track is numbered as "00" and the innermost track is numbered as "39". A distance between the center of the designated track and the magnetic head 59 is represented as the positioning error of the stepping motor as shown in FIG. 5. It has been known that an error curve appears at a period corresponding to the number of phases of the stepping motor (four phases in the present embodiment), and amount of errors of the tracks in the same phase is almost same. The phases 0, 1, 2 and 3 of the stepping motor are represented by O, X, Δ and □, respectively.

In order to determine the positioning error of the STM 55, the adjust signal track centers $T_1$, $T_{16}$, $T_{19}$, $T_{22}$ and $T_{25}$ of FIG. 2 are arranged to correspond to the vicinity of the outermost track, the phases of the stepping motor 55 and the vicinity of the innermost track, as shown in FIG. 6, respectively.

Figure 7:
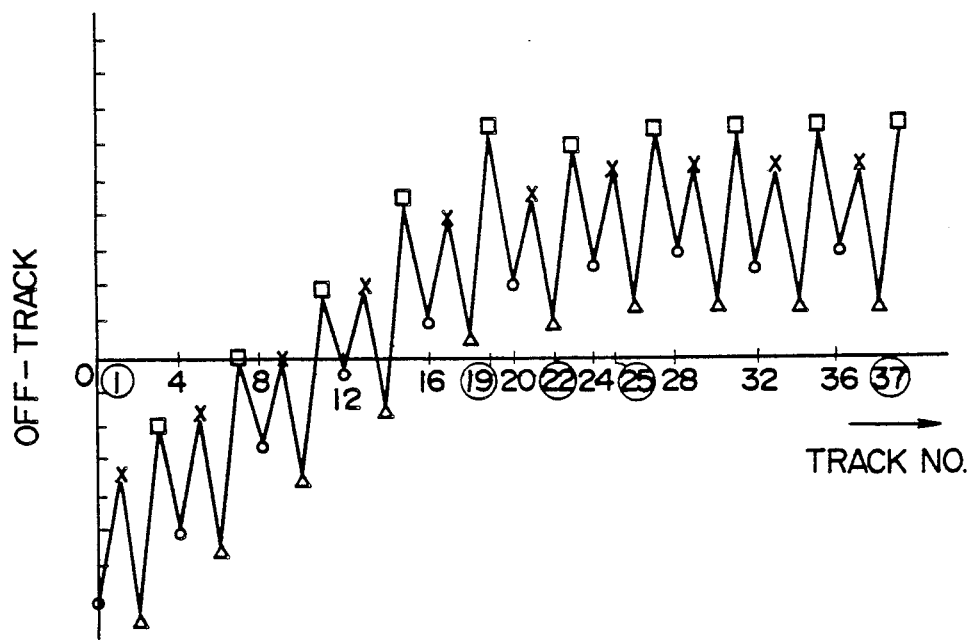
FIG. 7 is a characteristic chart illustrating an off-track when the stepping motor is assembled into the magnetic disk, driving apparatus.

FIG. 7 shows an off-track detected when the STM 55 having the characteristic shown in FIG. 5 is assembled into the magnetic disk driving apparatus. The curve shows a combination of the positioning error of the STM 55 and the accumulated error of the transmission system. In general, the accumulated error does not finely change. The adjust signal track centers ($T_1$ and $T_{37}$ in the present embodiment) are arranged in the vicinity of the outermost track and the innermost track of the alignment disk, and a gradient of the curve of FIG. 7 is linear-approximated from the off-tracks in those two tracks and the off-track in one of the tracks $T_{16}$, $T_{19}$, $T_{22}$ and $T_{25}$ In the present embodiment, the adjust signal track center is set in the tracks $T_1$ and $T_{37}$ of the same phase (phase 1 in the present embodiment) so that it is discriminated from the positioning error of the STM 55. The tracks marked with 0 in FIG. 7 indicate the tracks on which the adjust signals are recorded.

One embodiment of a tracking verification apparatus for the magnetic disk driving apparatus in accordance with the present invention is explained with reference to FIG. 8.

As shown in FIG. 8, the tracking verification apparatus comprises a magnetic disk driving apparatus 102, a rectifier 103, a filter 104, an A/D converter 105, I/O circuits 106 and 108 and a personal computer 107. The personal computer 107 has a CRT 108 and a keyboard 109, and also has a CPU, a ROM and a RAM (not shown).

The apparatus of FIG. 8 operates in the following manner.

The alignment disk 1 having the track diameter adjust signal, azimuth adjust signal and index timing adjust signal recorded on predetermined tracks is loaded to the magnetic disk driving apparatus 102. A control signal is supplied to the head carriage drive apparatus or the stepping motor of the magnetic disk driving apparatus 102 from the personal computer 107 through the I/O circuit 108 by manipulating the keyboard 109 so that the magnetic head is moved to the reference outermost track. Then, the magnetic head is moved to a predetermined track on the alignment disk 102 having the adjust signals recorded thereon. The adjust signal is reproduced from that track by the magnetic head and it is converted to a DC voltage containing a ripple component by the rectifier 103, and the high frequency ripple component is eliminated by the filter 104. The output of the filter 104 is converted to a digital signal by the A/D converter 105, and the digital data is written into the memory of the personal computer 107 through the I/O circuit 106. Then, the off-track, index timing and azimuth etc. are calculated based on the data stored in the memory. The magnetic head is then moved to an inner predetermined track of the alignment disk 1 and the same process is carried out. The data are also read from the remaining predetermined tracks in the same manner, and the direction of movement is changed so that the magnetic head is moved from the inner track to the outer track, and the same process is repeated. After the data have been read and processed for the predetermined tracks, the personal computer displays on the CRT the error or deviation in the radial direction between the upper and lower magnetic heads, positioning error of the STM, hysteresis error due to the direction of rotation of the STM, chucking error and accumulated error of the transmission system.

Figure 9:
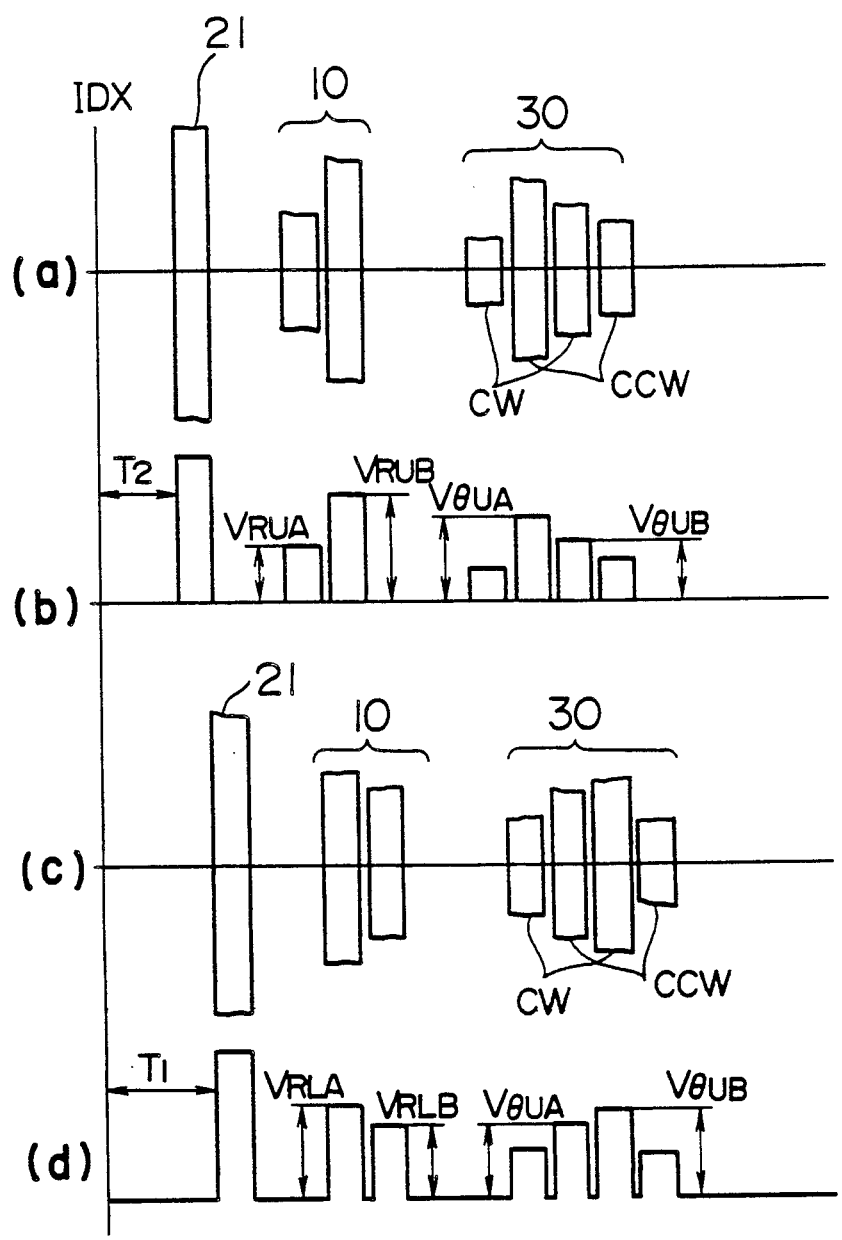

The operation to adjust and verify the magnetic disk driving apparatus by using the alignment disk 1 is explained. Waveforms of ⅛ period of adjust signals reproduced by scanning the track No. 25 corresponding to the adjust signal track center $T_{25}$ by the magnetic head, and output waveforms from the filter 104 of FIG. 8 are shown in FIG. 9, in which (a) shows a signal reproduced by the upper head, (b) shows a filter output signal for the upper head, (c) shows a signal reproduced by the lower head, and (d) shows a filter output signal for the lower head. Symbols $T_1$, $T_2$, $V_{RUA}$ etc. correspond to output values of the A/D converter 105 fetched into the computer 107.

(1) A positioning error between a radial position on the predetermined track and the lower (or upper) head is determined in proportion to a ratio $V_{RLA}/V_{RLB}$ (or $V_{RUA}/V_{RUB}$), that is, a ratio of a magnitude $V_{RLA}$ (or $V_{RUA}$) of the inner track signal of the track diameter adjust signal 10 and a magnitude $V_{RLB}$ (or $V_{RUB}$) of the outer track signal 12.

(2) The index timing is verified by detecting a time difference $T_1$ (or $T_2$) between a rise time point of the reproduced index timing adjust signal 21 detected by the lower (or upper) head and an index timing detection time point (IDX) 22. This time difference indicates a position of the magnetic head in the rotational direction of the disk from the reference position. The index timing is adjusted and verified such that the time difference is within a predetermined allowable time T.

(3) The azimuth angle is verified by determining a ratio (or $V_{\theta LA}/V_{\theta LB}$ (or $V_{\theta UA}/V_{\theta UB}$), that is, a ratio of a magnitude $V_{\theta LA}$ (or $V_{\theta UA}$) of the CW signal 31 of the azimuth adjust signal 30 detected by the lower (or upper) head and a magnitude $V_{\theta LB}$ (or $V_{\theta UB}$) of the CCW signal 32. This ratio indicates the azimuth angle of the magnetic head. Whether the azimuth angle of the R/W gap of the lower or upper magnetic head is within an allowable range or not is verified based on this ratio.

Thus, the adjustment and verification of precision in the radial direction of the track, the adjustment and verification in the index timing direction, and the adjustment and verification in the azimuth direction are simultaneously carried out.

Figure 10:
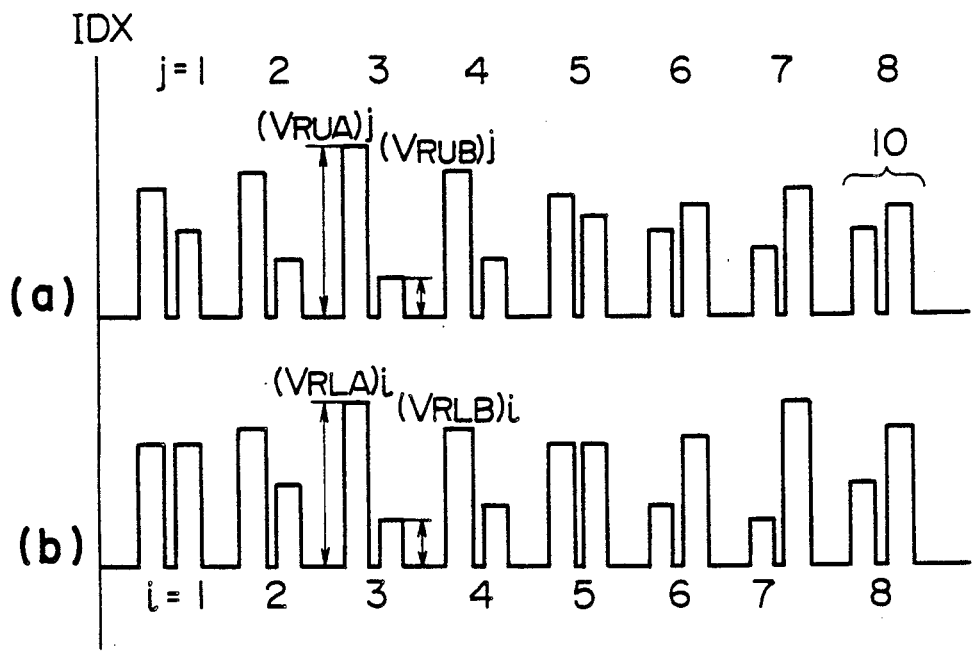

FIG. 10 shows waveforms of the track diameter adjust signal reproduced by the magnetic head 59 on the track No. 1 ($T_1$) in the vicinity of the outermost track, and filtered by the filter 104 of FIG. 8. In FIG. 10, (a) shows a waveform reproduced by the upper head, and (b) shows a waveform reproduced by the lower head. Sight pairs of track diameter adjust signal for one circle of track are shown in FIG. 10.

(1) A mean value $\Delta L$ (or $\Delta U$) in each track of positioning error between a radial position on the predetermined track and the lower (or upper) head is represented by $$\Delta L = \frac{1}{8} \cdot \sum_{i=1}^{8} \frac{W}{2} \cdot \frac{(V_{RLA})i - (V_{RLB})i}{(V_{RLA})i + (V_{RLB})i}$$

$$\Delta U = \frac{1}{8} \cdot \sum_{j=1}^{8} \frac{W}{2} \cdot \frac{(V_{RUA})j - (V_{RUB})j}{(V_{RUA})j + (V_{RUB})j}$$

where $(V_{RLA})i$ and $(V_{RLB})i$ (or $(V_{RUA})j$ and $(V_{RUB})j$) are magnitudes of the inner track signal $V_{RLA}$ (or $V_{RUA}$) and the outer track signal $V_{RLB}$ (or $V_{RUB}$) of each of the eight pairs of the adjust signals, and W is the R/W gap of the magnetic head 59. The error on each track can be determined in the same manner, and the off-track error due to the positioning error of the stepping motor, the hysteresis error and the accumulated error for the movement from the inner track to the outer track or from the outer track to the inner track, and the assembly error of the upper and lower heads of the magnetic head can be verified and adjusted.

(2) The accumulated error can be linearly approximated as; $\|\Delta_{37} - \Delta_1\|$ when $(\Delta_{37} - \Delta_{25})$ and $(\Delta_{25} - \Delta_1)$ are of the same sign (both + or −), or a larger one of $\|_{37} - \{_{25}\|$ and $\|\Delta_{25} - \Delta_1\|$ when $(\Delta_{37} - \Delta_{25})$ and $(\Delta_{25} - \Delta_1)$ are of the opposite signs (one is + and the other is −), where $\Delta_1$, $\Delta_{25}$ and $\Delta_{37}$ are position errors between the radial position on the track and the head in the tracks No. 1 ($T_1$), No. 25 ($T_{25}$) and No. 37 ($T_{37}$) which are of the same excitation phase of the STM 55. Thus, the accumulated error can be displayed and verified.

(3) The chucking error S which is the eccentric component error caused when the magnetic disk is chucked is represented by (for the lower head)

$$2S = \frac{W}{2} \cdot \left( \left( \frac{(V_{RLA})i - (V_{RLB})i}{(V_{RLA})i + (V_{RLB})i} \right)_{max} - \left( \frac{(V_{RLA})i - (V_{RLB})i}{(V_{RLA})i + (V_{RLB})i} \right)_{min} \right)$$

where $(V_{RLA})i/(V_{RLB})i$ or $(V_{RUA})j/(V_{RUB})j$ is the ratio of the eight pairs of track diameter adjust signals on one circle of track.

Figure 11:
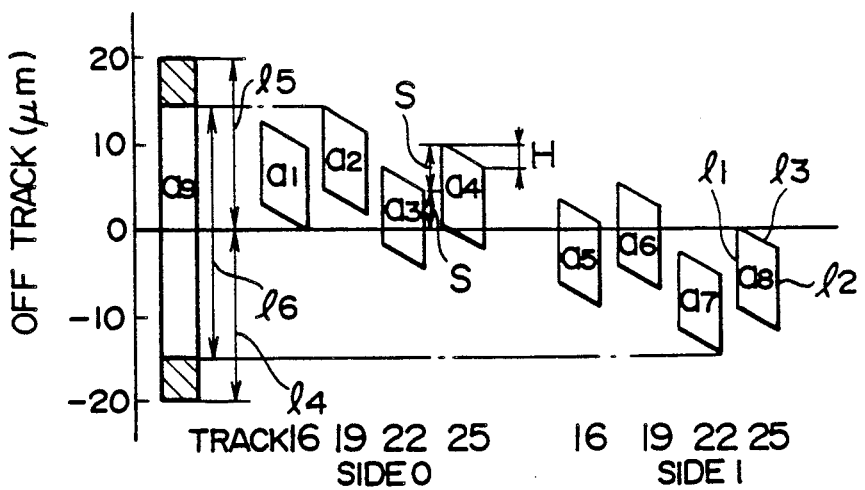

Those errors are displayed on the CRT 108 of the personal computer of FIG. 8 as shown in FIG. 11.

Diamonds $a_1$ to $a_8$ represent the error between the radial position on the track and the head, chucking error and hysteresis error etc. in the tracks No. 16 ($T_{16}$), No. 19 ($T_{19}$), No. 22 ($T_{22}$) and No. 35 ($T_{25}$), $a_1-a_4$ represent the errors produced when the lower head scans the rear side (side 0) of the alignment disk 1, and $a_5-a_8$ represent the errors produced when the upper head scans the front side (side 1) of the disk 1. The side $l_1$ (or $l_2$) in each track is represented by plotting the eight values $(V_{RLA})i/(V_{RLB})i$ or $(V_{RUA})j/(V_{RUB})j$. In each diamond, the left side $l_1$ represents the error produced when the head is moved inward, and the right side $l_2$ represents the error produced when the head is moved outward. Accordingly, the hysteresis error is represented by a vertical axis length H of a side $l_3$ connecting the side $l_1$ and the side $l_2$. The chucking error is represented by one half length of the side $l_1$ or side $l_2$. The radial direction error produced when the upper head and the lower head of the magnetic head 59 are assembled is represented by a difference between vertical axis lengths of the diamonds $a_1$ and $a_5$ for the same track (for example, track No. 16 ($T_{16}$)) on the front side and the rear side of the disk 1.

The variation of the positioning errors for the respective excitation phases of the STM can be grasped from the vertical axis positions of the diamonds $a_1-a_4$. A sum of the accumulated error and the track radial position error is represented by a rectangle $a_9$, where $l_6$ represents a maximum track radial position error in the four tracks shown on the right, and $l_4$ and $l_5$ represent the accumulated errors for the outermost track $T_1$, the track $T_{25}$ and the innermost track $T_{37}$, and $l_4$ and $l_5$ correspond to one of $(\Delta_{37}-\Delta_{25})$ and $(\Delta_{25}-\Delta_1)$. A sum of $l_4-l_6$ represents a sum of the track radial direction positioning errors of the magnetic disk driving apparatus determined by the alignment disk 1. Based on this sum, whether the position adjustment of the head carriage drive apparatus is within the allowable range or not can be determined. When a high density magnetic disk driving apparatus is to be verified, the use of $l_4$ and $l_5$ for the determination is very important in suppressing the error within the allowable range.

The verification results for the index timing and the azimuth angle may be numerically or graphically displayed as required.

The tracking method of the magnetic disk driving apparatus of the present invention is explained. In FIG. 4, the carriage 58 which carries the magnetic head 59 is moved by the stepping motor 55 through the steel belt 56. In order to maintain the data interchangeability which is important to the magnetic disk driving apparatus, the tracking is required. The alignment disk 1 having the track diameter adjust signal 10 recorded on the predetermined track center is loaded to the magnetic disk driving apparatus 102, the track diameter adjust signal 10 is read by the magnetic head 59, the stepping motor 55 is finely adjusted to the track radial direction P or Q to position the magnetic head to maintain the data interchangeability of the magnetic disk driving apparatus.

A method for adjusting the off-track by the tracking of the present embodiment is explained with reference to FIGS. 12, 13 and 14. A tracking verification apparatus (see FIG. 8) which measures the off-track between the alignment disk 1 having the track diameter the excitation phases of the stepping motor 55 (4-phase excitation stepping motor in the present embodiment) $T_{16}$, $T_{19}$, $T_{22}$ and $T_{25}$, and the magnetic head is used to display the off-track of the respective tracks on the CRT as shown in FIGS. 12-14.

A maximum off-track 110 on one track produced when the head is moved from the inner track to the outer track on the front side (side 0) of the disk is represented by ●, and a minimum off-track on one track produced when the head is moved from the outer track to the inner track is represented by o. A maximum off-track 112a on one track produced when the head is moved from the inner track to the outer track on the rear side (side 1) of the disk is represented by o, and a minimum off-track on one track produced when the head is moved from the outer track to the inner track is represented by ●. The stepping motor is finely adjusted radially of the track so that the maximum off-track 110a or 112a is within the allowable range 10b ($+20$ μm for 96 TPI, and $+15$ μm for 135 TPI).

A method for adjusting the off-track by the tracking method using the four-phase adjust signal is explained with reference to FIG. 13. The off-track in FIG. 3 is represented in the same manner as that of FIG. 12 but a mean value 117 of the off-tracks for all tracks is represented in FIG. 13. The mean value is obtained by averaging $\Delta L$ and $\Delta U$ for the tracks $T_{16}$, $T_{19}$, $T_{22}$ and $T_{25}$.

When the maximum off-track exceeds 20 μm, the stepping motor is finely adjusted radially of the track to set the mean value 117 to the vicinity of the predetermined track center of the alignment disk 1 to bring the maximum off-track within 20 μm. In accordance with the present embodiment, the off-tracks of the magnetic positioning precision of the magnetic head is improved.

A method for adjusting the off-track by another tracking method is explained with reference to FIG. 14.

In FIG. 14, the track diameter adjust signals on the tracks $T_{16}$, $T_{19}$, $T_{22}$ and $T_{25}$ as well as at least one of the innermost and outermost tracks $T_{37}$ and $T_{01}$ are used, and the mean value 117 of the off-tracks for the tracks $T_{01}$, $T_{10}$, $T_{19}$, $T_{22}$, $T_{25}$ and $T_{37}$ is calculated and displayed. If the maximum off-track exceeds 20 μm, the stepping motor is finely adjusted radially of the track to set the mean value 117 to the vicinity of the predetermined track center of the alignment disk 1 to bring the maximum off-track within 20 μm. In accordance with the present embodiment, the positioning precision of the magnetic head for all tracks including the innermost and outermost tracks is improved and the reliability is improved. If the maximum off-track exceeds the allowable range, whether it is mainly due to the error of the stepping motor or the error in the assembly work is determined by checking the chucking error, radial direction error between the upper and lower heads and hysteresis error etc. displayed on the CRT, and so the error in the next assembly can be brought within the allowable range. Thus, the productivity is improved.

Figure 15:
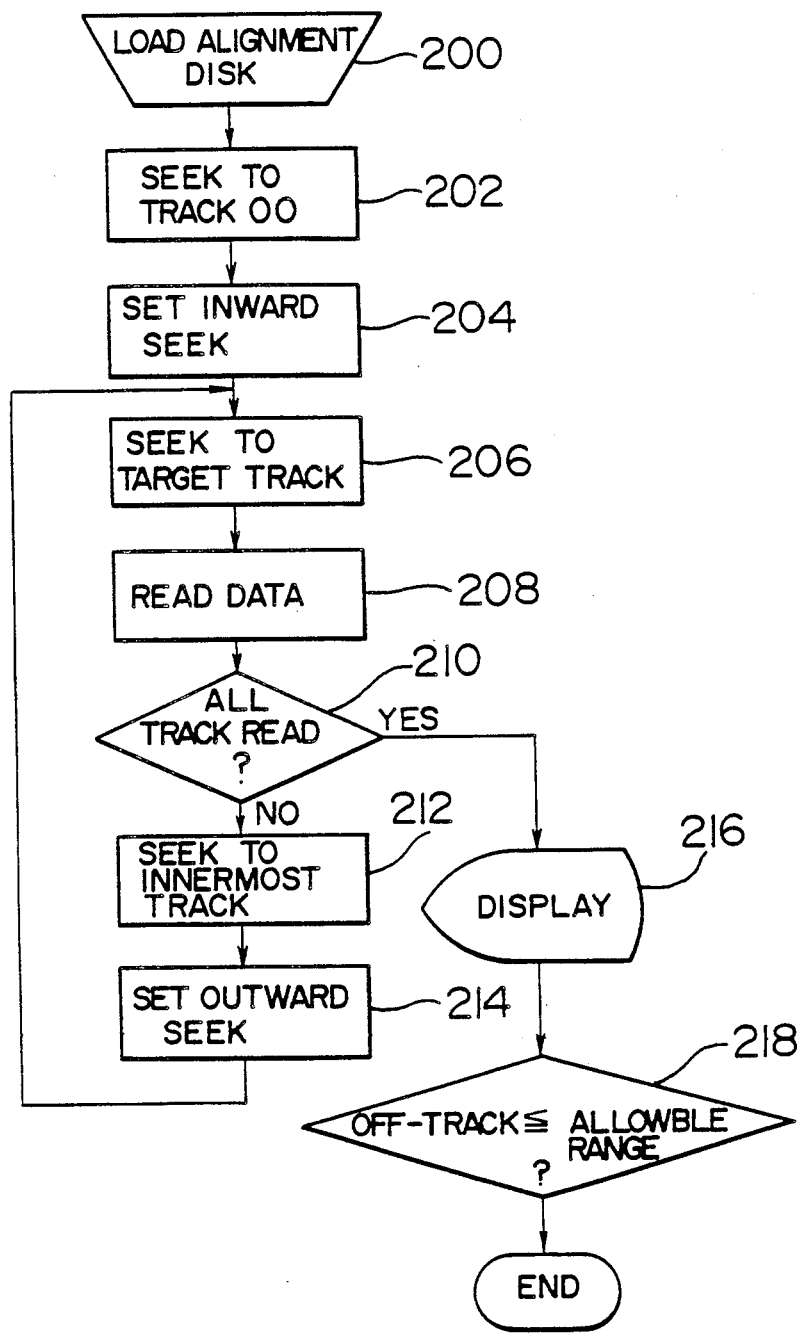

A flow chart of the tracking method of the present embodiment is explained with reference to FIG. 15.

In a step 200, the alignment disk 1 is loaded to the magnetic disk driving apparatus 102. In a step 202, the head is sought to the track No. 00 ($T_0$). In a step 204, the stepping motor 55 is set to seek the head inward. In a step 206, the carriage 58 which carries the magnetic head 59 is sought to the target track. In a step 208, the adjust signal is reproduced by the magnetic head.

The steps 206 and 208 are sequentially repeated to the tracks corresponding to the excitation phases of the stepping motor ($T_{16}$, $T_{19}$, $T_{22}$ and $T_{25}$ in the present embodiment) to read the data. In a step 210, whether the seeking from the outer track to the inner track and from the inner track to the outer track has been completed for the tracks $T_{16}$, $T_{19}$, $T_{22}$ and $T_{25}$ or not is checked, and if the decision is NO, the process proceeds to a step 212 where the head is sought to the innermost track $T_{39}$.

In a step 214, the stepping motor 55 is set to seek the head outward. In a step 206, the carriage 58 is sought to the target track and the data is read. In this manner, the tracks $T_{25}$, $T_{22}$, $T_{19}$ and $T_{16}$ are sequentially sought and the data are read.

When the seeking in the inward and outward directions and the reading of the data for all tracks are completed, the off-track on the target track is displayed on the CRT 108 in a step 216 as shown in FIGS. 12 and 13. In a step 218, whether the maximum off-track exceeds the allowable range or not is checked, and if it exceeds, it is displayed. If the maximum off-track exceeds the allowable range (approximately $\pm 20$ μm for the 5-inch 96 TPI alignment disk), the positioning is adjusted so that the off-track is brought within the allowable range.

The predetermined tracks $T_1$ and $T_{37}$ in the vicinity of the outermost track and the innermost track may be sought and the data thereof may be read and displayed as shown in FIG. 14. The hysteresis error positioning error of the STM, radial direction error between the upper and lower heads, accumulated error and the chucking error may be displayed as shown in FIG. 11.

In accordance with the present embodiment, whether the off-track is large due to the positioning error of the stepping motor and the hysteresis error, or it is due to the chucking error S, accumulated error or radial direction error between the upper and lower heads can be determined, and the productivity is improved.

The result of verification of the index timing and the azimuth angle may also be displayed.

In accordance with the present invention,
(1) precision of positioning
(2) positioning error of the stepping motor, hysteresis error and accumulated error of the transmission system, and
(3) chucking error of the magnetic disk and radial deviation between the lower head and the upper head can be collectively displayed on the CRT. Accordingly, by verifying a product, part by part, such as a magnetic disk driving apparatus in which the precision of the components has reached the limit and which is designed taking the required precision of each component into account in a probability distribution manner, the allowable range or required precision of the positioning error of the head carriage drive unit is determined for each magnetic disk drive apparatus. By adjusting the drive with necessary and sufficient precision, unnecessary and wasteful adjusting time is saved and the productivity, reliability and stability are improved. If the maximum off-track exceed the allowable range, the chucking error and the hysteresis error, positioning error of the stepping motor, radial direction error between the upper and lower heads and accumulated error etc. are checked based on the display on the CRT so that the component in trouble or the assembly process in trouble is determined. By adjusting the component in trouble in the next assembly, the productivity and reliability are improved.

In addition to the adjustment and verification in the radial direction of the track, the adjustment and verification in the direction of index timing, that is, the direction of rotation of the magnetic disk, by the use of the index timing adjust signal, and the adjustment and verification in the direction of the R/W gap inclination by the use of the azimuth adjust signal can be numerically done, and high precision adjustment and verification are attained, and the reliability for the high density disk drive apparatus is improved.

We claim:

1. An alignment disk for a magnetic disk drive apparatus having magnetic head means for recording and reproducing data on and from a magnetic recording medium, a head carriage for carrying the magnetic head means, and drive means having a stepping motor for driving the head carriage relative to the magnetic recording medium so as to radially cross a plurality of tracks of the magnetic recording medium, said alignment disk being loadable and unloadable to said magnetic disk drive apparatus and utilized for maintaining data interchangeability of said disk drive apparatus, said alignment disk comprising:

a magnetic disk medium member having a plurality of tracks;

a set of track diameter adjust signal pairs recorded on a number of tracks of said alignment disk, the number of tracks being equal to or larger in number than the number of phases of the stepping motor, the number of tracks respectively corresponding to at least the phases of said stepping motor, a set of track diameter adjust signal pairs being recorded on a track in the vicinity of at least one of an innermost track and an outermost track;

said set of track diameter adjust signal pairs each having an inner track signal and an outer track signal extending inward and outward from a center of a track, said inner and outer track signals being substantially equal in width and spaced along the track with a distance therebetween; and said set of track diameter adjust signal pairs being arranged symmetrically around a rotation axis of said disk;

wherein an amount and direction of displacement of the head means from a predetermined track can be detected by a ratio of a pair of output signal values respectively read from the predetermined track by the head means by tracing the inner and outer track signal of a set of track diameter adjust signal pairs disposed on the predetermined track, thereby enabling detection of an accumulated error of a drive force transmission system of the stepping motor accumulated through the relative movement of the head means between the inner track and the outer track.

2. An alignment disk according to claim 1, wherein an index timing adjust signal for detecting a position of said magnetic head means in the direction of disk rotation is arranged on a track at such a position that said index timing adjust signal is detected upon the lapse of a predetermined time after detection of an index timing detection point, and an azimuth adjust signal including at least on CW (clockwise) signal and CCW (counterclockwise) signal for detecting inclination of a read/write gap of said magnetic head means is recorded on the center of one track by a magnetic head having a predetermined angle clockwise with respect to a radial line extending rom said rotation axis to form the CW signal, and by a magnetic head having the predetermined angle counterclockwise to form the CCW signal.

3. An alignment disk according to claim 1, wherein said set of track diameter adjust signal pairs are arranged on both sides of said alignment disk.

4. An alignment disk according to claim 1, wherein the inner and outer track signals of each of said set of track diameter adjust signal pairs have the same size in both the circumferential and radial direction.

5. A tracking error verification apparatus for a magnetic disk drive apparatus including magnetic head means for recording and reproducing data on or from a magnetic recording medium, a head carriage for carrying said magnetic head means, and head carriage drive means having a stepping motor for driving said head carriage relative to said magnetic recording medium so as to radially cross a plurality of tracks of said magnetic recording medium, said magnetic disk drive apparatus positioning said magnetic head means radially of a predetermined track by reading by said head means an adjust signal recorded on an alignment disk to maintain data interchangeability of said magnetic disk drive apparatus, said alignment disk being loaded and unloaded to and from said magnetic disk drive apparatus, said alignment disk having a set of track diameter adjust signal paris recorded on a number of tracks of said alignment disk, the number of tracks being equal or larger in number than the number of phases of said stepping motor and which respectively correspond to at least the phases of said stepping motor, a set of track diameter adjust signal pairs being recorded on at least a track in the vicinity of at least one of an innermost track and an outermost track;

said apparatus comprising:
filter means for filtering the adjust signal read by said magnetic head means when said alignment disk is loaded to said magnetic disk drive apparatus and providing an output indicative thereof;
A/D conversion means for digitizing the output of said filter means and providing an output indicative thereof;
memory means for storing the output of said A/D conversion means;
control means for supplying a control signal to said head carriage drive means to drive said head carriage;
calculation means for calculating, based on the data stored in said memory means, at least an accumulated error accumulated through the movement of said head means from the inner track to the outer track in an error of said magnetic head means, said error including a positioning error of said drive means, a hysteresis error depending on the direction of drive of said carriage, and an eccentricity error of the disk;
display means for displaying a result of said calculation means; and
said control means controlling said head carriage to move from the outer track to the inner track and from the inner track to the outer track so that said magnetic head means scans the track corresponding to at least the phases of the stepping motor for driving said head carriage.

6. A tracking error verification apparatus according to claim 5 wherein said control means controls said head carriage to move from the outer track to the inner track and from the inner track to the outer track so that said magnetic head means scans the tracks corresponding to the excitation phases of said stepping motor as well as at least one track in the vicinity of at least one of the outermost track and the innermost track.

7. A tracking error verification apparatus according to claim 5 wherein said alignment disk further has an index timing adjust signal for detecting a position of said magnetic head means in the direction of disk rotation and an azimuth adjust signal for detecting an inclination of a read/write gap of the magnetic head means, recorded thereon, and the index timing adjust signal and the azimuth adjust signal are read and processed to display the inclination of said magnetic head means nd the position of said magnetic head means from a reference position in the direction of disk rotation.

8. A tracking error verification apparatus according to claim 7 wherein said control means controls said head carriage to move from the outer track to the inner track and from the inner track to the outer track so that said magnetic head means scans the tracks corresponding to the excitation phases of said stepping motor as well as one or both of the tracks in the vicinity of the outermost track and the innermost track.

9. A tracking error verification apparatus according to claim 5, wherein said set of track diameter adjust signal paris each have an inner track signal and an outer track signal extending inward and outward from a center of the track, the inner and outer track signals of respective pairs having the same size in the circumferential and radial directions, said set of track diameter adjust signal pairs being arranged symmetrically around a rotation axis of said alignment disk.

10. A tracking error verification apparatus for a magnetic disk drive apparatus including magnetic head means for recording and reproducing data on and from a magnetic recording medium, a head carriage for carrying said magnetic head means, and drive means having a stepping motor for moving the head carriage relative to the magnetic recording medium so as to radially cross a plurality of tracks of the magnetic recording medium, aid magnetic disk drive apparatus positioning said magnetic head means radially of a predetermined track by reading with said head means an adjust signal recorded on an alignment disk to maintain data interchangeability of said magnetic disk drive apparatus, said alignment disk being loadable to and unloadable from said magnetic disk drive apparatus, said alignment disk having a plurality of tracks including a plurality of first tracks and at least one second track, the adjust signal including a set of track diameter adjust signal pairs recorded on each of the plurality of first tracks, the plurality of first tracks being equal to or larger in number than the number of phases of the stepping motor and which respectively correspond to at least the phases of said stepping motor, the set of track diameter adjust signal pairs also being recorded on the at least one second track, the at least one second track being located in the vicinity of at least one of an innermost track and an outermost track, said set of track diameter adjust signal pairs each having an inner track signal and an outer track signal extending inward and outward from a center of a track such that widths of the inner and outer track signals along the perpendicular directions to the track are substantially equal and the inner track signal and the outer track signal of each of the track diameter adjust signal pairs are spaced with a distance along the track therebetween;

said apparatus comprising:
control means for controlling said drive means so as to move said head carriage relative to said alignment disk so that said head means traces the set of track diameter adjust signal pairs recorded on at least the plurality of first tracks and at least one second track; and calculation means for calculating at least one error in accordance with a set of track diameter adjust signal pairs read by said head means and outputting the error as an output of the verification apparatus, said calculation means including means for calculating a ratio of a pair of output signal values respectively read by the head means by tracing inner and outer track signals of said set of track diameter adjust signal pairs read by said head means to thereby obtain an amount and direction of displacement of the head means from the track, and means for calculating as the at least one error an accumulated error or a drive force transmission system of the stepping motor in accordance with ratios of pairs of output signal values obtained by tracing the sets of track diameter adjust signal pairs recorded on the plurality of first tracks and at least one second track.

11. A tracking error verification apparatus according to claim 10, wherein said control men includes means for controlling said drive means such that said head means traces the set of track diameter adjust signal pairs of each of the at least one second track and one of the first tracks, the second track and the one first track corresponding to a same phase of the stepping motor, and said calculation means including means for calculating for each of the second track and the one first track an average value of ratios of pairs of output signals of the set of track diameter adjust signal pairs recorded respectively thereon and means for calculating the accumulated error in accordance with the average values.

12. A tracking error verification apparatus according to claim 10, wherein said control means includes means for controlling said drive means in a manner that said head carriage is moved from the outer track to the inner track and from the inner track to the outer track so as to enable said head means to at least trace the set of track diameter adjust signal pairs of each of the plurality of first tracks, and said calculation means also including means for calculating for each of the first tracks an average value of ratios of pairs of output signals of the set of track diameter adjust signal pairs, the pairs of output signal pairs of each of the first tracks, and means for calculating as the at least one error at least one of an error of said magnetic head means, a positioning error of said drive means and a hysteresis error depending on the direction of drive of said carriage in accordance with the average values.

13. A tracking error verification apparatus according to claim 10, wherein said control means includes means for controlling said drive means in a manner that asid head carriage is moved from at least one of the outer track to the inner track and the inner track to the outer track so as to enable said head means to at least trace the set of track diameter adjust signal pairs of each of the plurality of first tracks, and said calculation means also including means for calculating for each of the first tracks an average value of ratios of pairs of output signals of the set of track diameter adjust signal pairs, the pairs of output signals being obtained by tracing the set of track diameter adjust signal pairs of each of the first tracks, and means for calculating as the at least one error at least one of an error of said magnetic head means and a positioning error of said drive means in accordance with the average values.

14. A tracking error verification apparatus according to claim 10, wherein said control means includes means for controlling said drive means such that said head carriage is moved from the outer track to the inner track and from the inner track to the outer track so as to enable said head means to trace the set of track diameter adjust signal pairs of each of at least one of the plurality of firts tracks and that at least one second track for each movement of said carriage from the outer track to the inner track and from the inner track to the outer track, and said calculation means including means for calculating for each movement of said head carriage from the outer track to the inner track and from the inner track to the outer track an average value of ratios of pairs of output signals of the set of track diameter adjust signal pairs obtained by tracing the set of track diameter adjust signal pairs of each of at leeast one of the plurality of first tracks and the at least one second track and means for calculating as the at least one error a hysteresis error depending on the direction of drive of said carriage in accordance with the average values.

15. A tracking error verification apparatus according to claim 10, wherein said control means includes means for controlling said drive means such that said head means traces the set of track diameter adjust signal pairs of at least one of the plurality of first tracks and the at least one second track, and said calculation means includes means for calculating as the at least one error an eccentricity error of the alignment disk in accordance with ratios obtained by tracing the set of track diameter adjust signal pairs of the at least one of the plurality of first tracks and at least one second track.

16. A tracking error verification apparatus according to claim 10, wherein said alignment disk further has an index timing adjust signal for detecting a position of said magnetic head means in the direction of disk rotation and an azimuth adjust signal for detecting an inclination of a read/write gap of the magnetic head means recorded on at least one of the plurality of first tracks and the at least one second track, said control means including means for controlling said drive means such that said head means traces the index timing adjust signal and the azimuth adjust signal, and said calculation means includes means for calculating and outputting an inclination of said magnetic head means and a position of said magnetic head means from a reference position in the direction of disk rotation in accordance with the index timing adjust signal and the azimuth adjust signal read by said head means.

17. A tracking error verification apparatus according to clai 10, wherein a number of the set of track diameter adjust signal pairs recorded on each of the plurality of first tracks and the at least one second track is in a range of 4 to 96, said set of track diameter adjust signal pairs being arranged symmetrically around a rotation axis of said disk.

18. A tracking error verification apparatus for a magnetic disk driving apparatus including magnetic head means for recording and reproducing data on and from a magnetic recording medium, a head carriage for carrying said magnetic head means, and drive means having a stepping motor for moving the head carriage relative to the magnetic recording medium so as to radially cross a plurality of tracks of the magnetic recording medium said magnetic disk drive apparatus positioning said magnetic head means radially of a predetermined track by reading with said head means an adjust signal recorded on an alignment disk to maintain data interchangeability of said magnetic disk drive apparatus, said alignment disk being loadable to and unloadable from said magnetic disk drive apparatus, said alignment disk having a plurality of tracks and having as the adjust signal a set of track diameter adjust signal pairs recorded on at least one of the plurality of tracks, said set of track diameter adjust signal pairs each having an inner track signal and an outer track signal extending inward and outward from a center of a track such that widths of the inner and outer track signals along the perpendicular directions to the track are substantially equal and that the inner track signal and the outer track signal of each of the track diameter adjust signal pairs are spaced with a distance along the track therebetween;

said apparatus comprising:
control means for controlling said drive means so as to move said head carriage relative to said alignment disk, said control means controlling said drive means such that said head means traces the set of track diameter adjust signal pairs recorded on the at least one track; and calculation means for calculating at least one error in accordance with the set of track diameter adjust signal pairs read by said head means and outputting the error as an output of the verification apparatus, said calculation means including means for calculating a ratio of a pair of output signal values respectively read by the head means by tracing the set of track diameter adjust signal pairs recorded on the at least one track to thereby obtain an amount and direction of displacement of the head means from the track, and means for calculating as the error an eccentricity error of the disk in accordance with ratios of pairs of output signal values obtained by tracking the set of track diameter adjust signal pairs on the at least one track.

19. A tracking error verification method for a magnetic disk drive apparatus including magnetic head means for recording and reproducing data on and from a magnetic recording medium, a head carriage for carrying said magnetic head means, and drive means having a stepping motor for moving the head carriage relative to the magnetic recording medium so as to radially cross a plurality of tracks of the magnetic recording medium, said magnetic disk drive apparatus positioning said magnetic head means radially of a predetermined track by reading with said head means an adjust signal recorded on an alignment disk to maintain data interchangeability of said magnetic disk drive apparatus, said alignment disk being loadable to and unloadable from said magnetic disk drive apparatus, said alignment disk having a plurality of tracks including a plurality of first tracks and at least one second track, the adjust signal including a set of track diameter adjust signal pairs recorded on each of the plurality of first tracks, the plurality of first tracks being equal to or larger in number than the number of phases of the stepping motor and which respectively correspond to at least the phases of said stepping motor, the set of track diameter adjust signal pairs also being recorded on the at least one second track, the at least one second track being located in the vicinity of at least one of an innermost track and an outermost track, said set of track diameter adjust signal pairs each having an inner track signal and an outer track signal extending inward and outward from a center of a track in a manner that widths of the inner and outer track signals along the perpendicular directions to the track are substantially equal and the inner track signal and the outer track signal of each of the track diameter adjust signal pairs are spaced with a distance along the track therebetween;

said tracking error verification method comprising the steps of:
(i) controlling said drive means so as to move said head carriage relative to said alignment disk so that said head means traces the set of track diameter adjust signal pairs recorded on at least the plurality of first tracks and at least one second track; and
(ii) calculating and outputting an error in accordance with the set of track diameter adjust signal pairs traced by said head means, said calculating and outputting step including a step of calculating a ratio of a pair of output signal values respectively read by the head means by tracing inner and outer track signals of said set of track diameter adjust signal pairs recorded on the plurality of first tracks and the at least one second track to thereby obtain an amount and direction of displacement of the head means from the track, and a step of calculating as the error an accumulated error of a drive force transmission system of the stepping motor in accordance with ratios of pairs of output signal values obtained by tracing the sets of track diameter adjust signal pairs recorded on the plurality of first tracks and at least one second track.

20. A tracking error verification method according to claim 19,
said tracking error verification method further comprising the steps of:
reading at least the sets of the track diameter adjust signal pairs recorded on at least the plurality of first tracks and the at least one second track by said magnetic head means to measure a positioning error or off-track of said magnetic head means including a positioning error of said stepping motor; and
adjusting the off-track so that a maximum and a minimum of the off-track are brought within an allowable range.

21. A tracking error verification method according to claim 20 wherein the tracks of said alignment disk equal to or larger in number than the number of excitation phases of said stepping motor and corresponding to at least said excitation phases are scanned by said magnetic head means to measure the positioning error or the off-track of said magnetic head means, and a mean value of the off-track for said tracks is set to a center of a reference track of the alignment disk.

22. A tracking error verification method according to claim 19, wherein at least the accumulated error is measured among off-track errors including a tracking difference between upper and lower heads of said head means, a chucking error, a positioning error of said stepping motor, the accumulated error, and a hysteresis error so as to enable verification of the tracking error.

23. A tracking error verification method according to claim 19, wherein said controlling step includes a step of controlling said drive means such that said head means traces the set of track diameter adjust signal pairs of each of the at least one second track and one of the first tracks, the at least one second track and the one first track respectively corresponding to a same phase of the stepping motor, and said calculating and outputting step includes a step of calculating for each of the at least one second track and the one first track an average value of ratios of pairs of output signals of the set of track diameter adjust signal pairs recorded respectively thereon and a step of calculating the accumulated error in accordance with the average values.

24. A tracking error verification method according to claim 19, wherein said controlling step includes a step of controlling said drive means in a manner that said head carriage is moved from the outer track to the inner track and from the inner track to the outer track so as to enable said head means to at least trace the set of track diameter adjust signal pairs of each of the plurality of first tracks, and said calculating and outputting step includes a step of calculating for each of the first tracks an average value of ratios of pairs of output signals of the set of track diameter adjust signal pairs, the pairs of output signals being obtained by tracing the set of track diameter adjust signal pairs of each of the first tracks, and a step of calculating as the error at least one of an error of said magnetic head means, a positioning error of said drive means and a hysteresis error depending on the direction of drive of said carriage in accordance with the average values.

25. A tracking error verification method according to claim 19, wherein said controlling step includes a step of controlling said drive means such that said head carriage is moved from at least one of the outer track to the inner track and the inner track to the outer track so as to enable said head means to at least trace the set of track diameter adjust signal pairs of each of the plurality of first tracks, and said calculating and outputting step includes a step of calculating for each of the first tracks an average value of ratios of pairs of output signals of the set of track diameter adjust signal paris, the pairs of output signals being obtained by tracing the set of track diameter adjust signal pairs of each of the first tracks, and a step of calculating as the error at least one of an error of said magnetic head means and a positioning error of said drive means in accordance with the average values.

26. A tracking error verification method according to claim 19, wherein said controlling step includes a step of controlling said drive means such that said head carriage is moved from the outer track to the inner track and from the inner track to the outer track so as to enable said head means to trace the set of track diameter adjust signal pairs of each of at least one of the plurality of first tracks and the at least one second track for each movement of said carriage from the outer track to the inner track and from the inner track to the outer track, and said calculating and outputting step includes a step of calculating for each movement of said head carriage from the outer track to the inner track and from the inner track to the outer track an average value of ratios of pairs of output signals of the set of track diameter adjust signal pairs obtained by tracing the set of track diameter adjust signal pairs of each of at least one of the plurality of first tracks and the at least one second track and a step of calculating as the error a hysteresis error depending on the direction of drive of said carriage in accordance with the average values.

27. A tracking error verification method according to claim 19, wherein said controlling step includes a step of controlling said drive means such that said head means traces the set of track diameter adjust signal pairs of at least one of the plurality of first tracks and the at least one second track, and said calculating and outputting step includes a step of calculating as the error an eccentricity error of the disk in accordance with ratios obtained by tracing the set of track diameter adjust signal pairs of the at least one of the plurality of first tracks and the at least one second track.

28. A tracking error verification method according to claim 19, wherein said alignment disk further has an index timing adjust signal for detecting a position of said magnetic head means in the direction of disk rotation and an azimuth adjust signal for detecting an inclination of a read/write gap of the magnetic head means recorded on at least one of the plurality of first tracks and the at least one second track, said controlling step including a step of controlling said drive means such that said head means traces the index timing adjust signal and the azimuth adjust signal, and said calculating and outputting step includes a step of calculating and outputting an inclination of said magnetic head means and a position of said magnetic head means from a reference position in the direction of disk rotation in accordance with the index timing adjust signal and the azimuth adjust signal read by said head means.

29. A tracking error verification method according to claim 19, wherein a number of the set of track diameter adjust signal pairs recorded on each of the plurality of first tracks and the at least one second track is in a range of 4 to 96, said set of track diameter adjust signal pairs being arranged symmetrically around a rotation axis of said disk.

30. A tracking error verification method for a magnetic disk driving apparatus including magnetic head means for recording and reproducing data on and from a magnetic recording medium, a head carriage for carrying said magnetic head means, and drive means having a stepping motor for moving the head carriage relative to the magnetic recording medium so as to radially cross a plurality of tracks of the magnetic recording medium, said magnetic disk drive apparatus positioning said magnetic head means radially of a predetermined track by reading with said head means an adjust signal recorded on an alignment disk to maintain data interchangeability of said magnetic disk drive apparatus, said alignment disk being loadable to and unloadable from said magnetic disk drive apparatus, said alignment disk having a plurality of tracks and having as the adjust signal a set of track diameter adjust signal pairs recorded on at least one of the plurality of tracks, said set of track diameter adjust signal pairs each having an inner track signal and an outer track signal extending inward and outward from a center of a track such that widths of the inner and outer track signals along the perpendicular directions to the track are substantially equal and that the inner track signal and the outer track signal of each of the track diameter adjust signal pairs are spaced with a distance along the track therebetween;

said verification method comprising the steps of:
  (i) controlling said drive means so as to move said head carriage relative to said alignment disk so that said head means traces the set of track diameter adjust signal pairs recorded on the at least one track; and
  (ii) calculating and outputting an error in accordance with the set of track diameter adjust signal pairs traced by said head means, said calculating and outputting step including a step of calculating a ratio of a pair of output signal values respectively read by the head means by tracing inner and outer track signals of said set of track diameter adjust signal pairs recorded on the at least one track to thereby obtain an amount and direction of displacement of the head means from the track, and a step of calculating as the error an eccentricity error of the disk in accordance with ratios of pairs of output signal values obtained by tracing the set of track diameter adjust signal pairs on the at least one track.

* * * * *